United States Patent
Arroyo

[15] 3,690,018
[45] Sept. 12, 1972

[54] MATHEMATICS TRAINING TOY

[72] Inventor: John J. Arroyo, 3255 W. 65th Ave., Denver, Colo. 80221

[22] Filed: Dec. 3, 1970

[21] Appl. No.: 94,686

[52] U.S. Cl. .................................................35/31 C
[51] Int. Cl. ............................................G09b 19/02
[58] Field of Search.........35/31 R, 31 C, 31 D, 31 G, 35/70

[56] References Cited

UNITED STATES PATENTS

| | | | |
|---|---|---|---|
| 2,463,763 | 3/1949 | Graff | 35/31 D X |
| 2,494,497 | 1/1950 | Trapnell | 35/31 D |
| 2,530,898 | 11/1950 | Morrison | 46/1 A |
| 2,609,637 | 9/1952 | Spence | 46/1 A X |
| 3,455,033 | 7/1969 | Han | 35/31 R |
| 3,486,245 | 12/1969 | Nelson | 35/31 C |

*Primary Examiner*—Wm. H. Grieb
*Attorney*—Richard D. Law

[57] ABSTRACT

An educational toy to teach arithmetic operations which have integer solutions; includes a sloping hollow cylinder, with a spring detent at the lower end, for filling with a predetermined number of marbles. When one peg, of a number of various length pegs, is inserted in the cylinder and pressed down on the column of marbles, the spring detent passes the number of marbles corresponding to the peg length. The marbles are displayed for counting and for re-insertion into the cylinder. The pegs are color coded to problem cards insertable into holders on the pegs, so that the number of marbles driven from the cylinder corresponds to the answer of a particular color.

11 Claims, 7 Drawing Figures

PATENTED SEP 12 1972 3,690,018
SHEET 1 OF 2
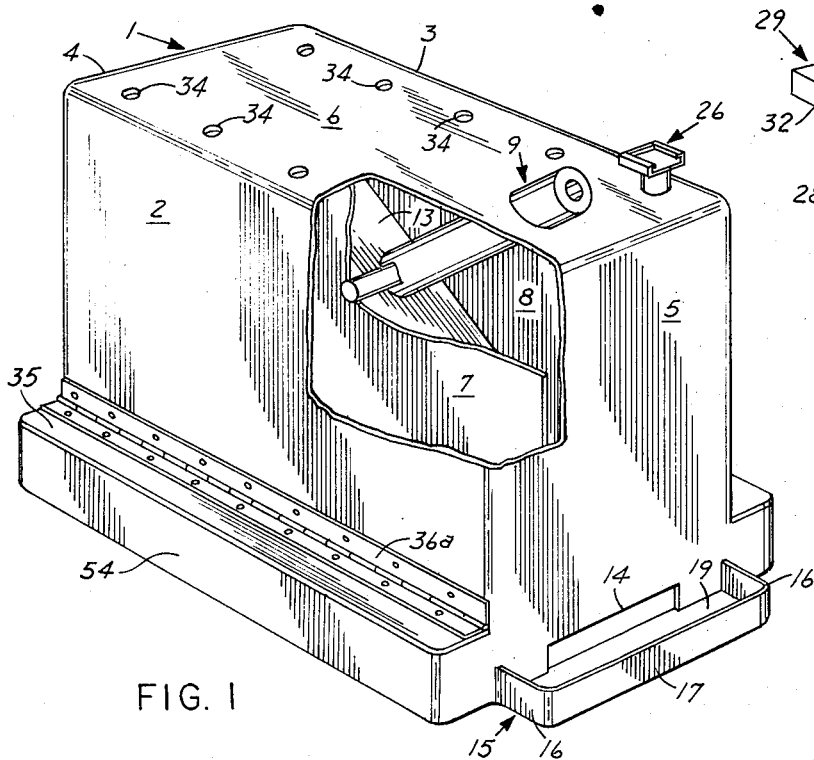
FIG. 1
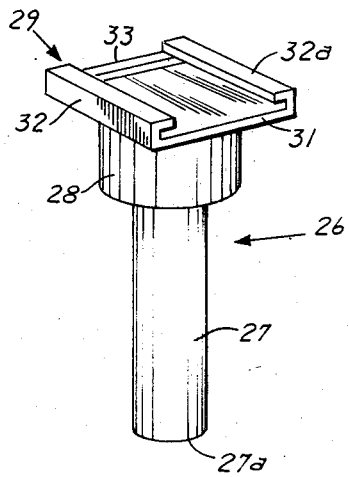
FIG. 2
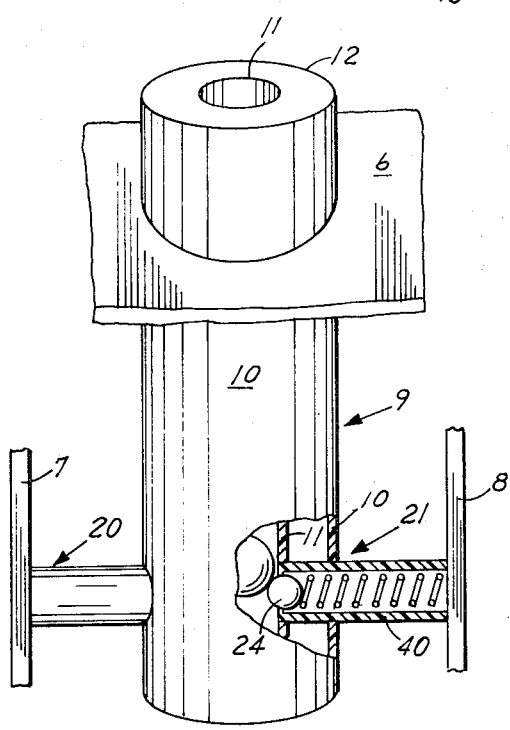
FIG. 3
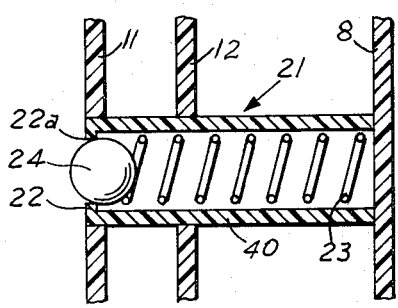
FIG. 4
FIG. 5
INVENTOR
JOHN J. ARROYO
BY Richard D. Law
ATTORNEY INVENTOR
JOHN J. ARROYO
BY
Richard H. Law
ATTORNEY

MATHEMATICS TRAINING TOY

Educators, in view of recently acquired experimental evidence, now generally concur that very young children are apparently capable of conceptual learning, such as mathematics, and memory learning, such as languages. Traditionally, only older children or adults were exposed to such information, on the belief that younger children could not comprehend the information. Today, children are being taught at progressively younger ages. The complexities of today's society requires that each citizen must possess more knowledge than in bygone years; acquisition by the child of fundamental knowledge at a young age will significantly reduce the burden of teaching increasing amounts of information during the primary and secondary school years.

Many teaching devices and educational toys have been developed to aid in the education of a child. A distinction may be made between teaching devices and educational devices. Educational devices generally require an experienced person to operate the device in a certain mode in order to illustrate a principle in a rather dramatic fashion. Unless the device is operated in that particular mode, meaningful results will not be shown. On the other hand, the ways in which toys are used are limited only by a child's imagination. A child may soon lose interest, forget or fail to understand a complex series of steps which must be followed to arrive at a specific result. The curiosity, ingenuity, and imagination of the child soon takes hold and the child begins to use a device or toy in various manners. With a toy or device where a desired result only occurs following specific steps, the educational value is lost when the child begins to innovate. Accordingly, in order for a toy to have educational value, the toy must be capable of encouraging a given mode of operation and must illustrate a meaningful principle even when utilized in various modes.

Further, it is known that the most effective toys, those toys which maintain the attentive interest of a child, stimulate a combination of the child's sensory perceptions. Many educational toys are limited in effectiveness by failure to stimulate a variety of the child's perceptual senses. Tactile manipulation maintains interest and is important for training the motor reflexes. Visual stimulation, such as color, usually delights a child. Noise, movement, and action further stimulates a child. Toys with which the child may be fairly aggressive are also very effective.

The present invention relates to an educational toy which may be easily manipulated by a child to illustrate meaningful mathematical principles to reinforce the educational process. The toy of the invention may be used with or without adult supervision. The toy of the present invention, incorporates sight, sound, movement, and action to stimulate a child's visual, tactile, and auditory senses. Faculties to maintain a child's interest and stimulate his imagination.

More specifically, the present invention relates to a toy for illustrating arithmetic operations such as addition, multiplication, substraction, and division. A given number of hard, rollable objects, such as marbles, are placed as a column in the top end of a hollow cylinder having a retaining spring detent at the bottom end. When one of a number of graduated-length pegs is inserted in the cylinder and pushed down against the marbles, the spring detent will pass a number of marbles according to the length of the peg. The cylinder is mounted on a frame and leads to a ramp and to a catch basin. Marbles which are forced past the detent will roll down the ramp into the catch basin; the marbles are then to be inserted, one-by-one, back into the top of the cylinder. A child, thus, is encouraged to count the marbles as he inserts them. The pegs are of a different color, thereby reinforcing the fact that the number of released marbles varies according to the peg length. The pegs may be provided with handles with card holders thereon and a number of problem cards may be provided with the toy. Each card may display an arithmetic expression whose result is a positive integer. The cards may then be colored such that the card color corresponds to the color of the peg which will drive a number of marbles from the cylinder equal to the solution of the arithmetic expression on the face of the card. Thereby, the toy teaches that various arithmetic combinations yield the same integral value, directly expressed in marbles.

It is, therefore, an object of the present invention to provide an educational toy to aid in the teaching of arithmetic.

A further object of the invention is to provide an educational toy involving motion, action, sound, and tactile stimulation.

A still further object of the invention is to provide an educational toy which yields meaningful results and encouraging a single mode of operation.

Another object of the invention is to provide an educational toy which may be aggressively operated by a child.

Yet another object of the invention is to provide an educational toy which includes the release of a column of marbles from a hollow cylinder having a spring-loaded detent at the discharge end.

Still another object of the invention is to provide an educational toy discharging a number of marbles from a cylinder in accordance with the length of a peg inserted in the cylinder.

These and other objects and advantages of the present invention may be readily ascertained by referring to the following description and appended illustrations in which:

FIG. 1 is a perspective view, partially cutaway, of one embodiment of the invention;

FIG. 2 is a perspective detail of a component member of the invention;

FIG. 3 is another perspective detail of a marble holder of the invention;

FIG. 4 is still another perspective detail of a problem card for use with the invention;

FIG. 5 is a section view of a detail of the invention;

Figure 6:
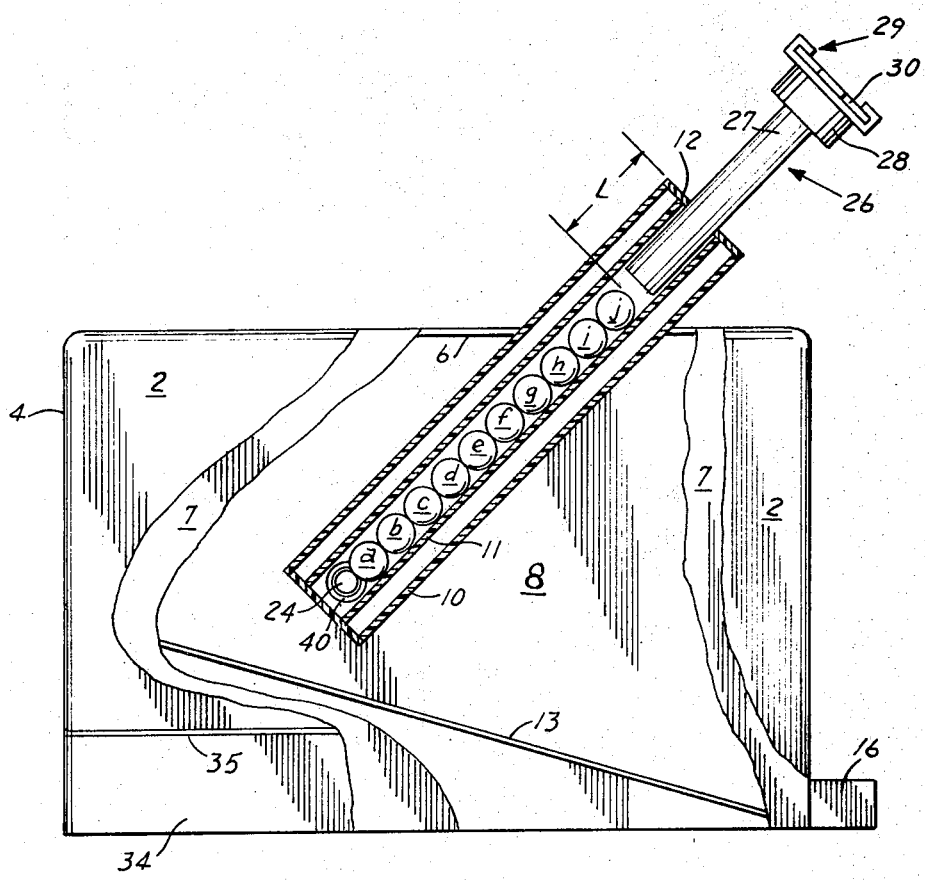
FIG. 6 is a side view, partially cutaway of the invention.

In the device selected for illustration, a frame, indicated in general by numeral 1, is embodied as a box with upstanding opposed sides 2 and 3, upstanding opposed ends 4 and 5 and top 6. A wide variety of frame materials may be used; clear plastic or plexiglass is suggested as enhancing the visual interest of the toy.

Frame 1 further includes upstanding interior support walls 7 and 8, respectively, which are parallel to side walls 2 and 3, and which also may be fabricated from clear plastic. Top 6 supports concentric tubular members, indicated in general by numeral 9 in FIG. 1 and shown in detail in FIG. 3. Tubular or cylindrical members 9 are mounted downward sloping in the frame, with a substantial upward portion extending above the frame top 6. The upper portion of the tubular members may be supported by top 6 by forming a suitable elliptical aperture in the top 6 and securing cylinders 9 therein, as by cementing. The lower or outlet end of cylinder members 9 terminates above downward sloping ramp 13. The ramp 13 may be supported at the upper end against end wall 4 and at the lower end against end wall 5, and be further supported between side walls 7 and 8. Ramp 13 leads down to an opening 14 formed in wall 5. In front of the opening 14 is placed an open catch basin, indicated in general by numeral 15. In the illustrated embodiment, the basin has end walls 16, front wall 17, and floor 19, all secured together and supported by wall 5. Obviously the open catch basin may have a wide variety of configurations, and the illustrated embodiment was chosen merely as being of particularly simple construction.

The cylinder members, FIG. 3, includes a hollow, elongated right cylinder 10 having square cut ends, an upper end cap 12, and a corresponding lower end cap (not shown). Cylinder 10 may be fabricated from rigid plastic tubing with the end caps glued thereto. Each end cap has a central aperture therethrough; hollow, right cylinder 11 is inserted axially concentric to cylinder 10 and supported at its opposed ends by the end caps. While two concentric cylinders have been shown, it will be evident from a description of the operation that the toy of the invention may function satisfactorily using only a single hollow cylinder, such as 11.

Support for the lower end of the cylinder members 9 in frame 1, according to the illustrated embodiment, may be provided by detent means, represented in general by numerals 20 and 21, bracing the cylinder members 9 between support walls 7 and 8 as shown in FIG. 3. Clearly, other means of supporting the lower end of the cylinder members 9 in the frame 1 may be provided. Detent means 21 are further shown in FIG. 5, detent means 20 being identical. The detent means includes a hollow, open-ended tube 40 supported at the first end by wall 8 and having the second end communicating through cylinder walls 10 and 11 and being supported thereby. The second end is partially closed by lip 22 set flush with wall 11 and having aperture 22a therein. In tube 40 is placed ball bearing member 24 biased towards cap 22 by conventional compression spring 23. The ball bearing member 24 is chosen to have a diameter such that a significant portion of the member protrudes through aperture 22a into the interior of cylinder 11.

FIG. 6 shows the toy in position for operation by a child. Cylinder 11 is filled with a column of a given number of ball members ($a$, $b$, $c$, etc.), the column being supported by the lowest ball member $a$ resting against the protruding portion of detent ball bearing 24. The ball members may be of any hard, non-deforming material; children's marbles having a diameter of about one-half inch are suggested. The diameter of cylinder 11 is matched to the diameter of the ball members so that the cylinder diameter only slightly exceeds the diameter of a ball member. Ten ball members are shown in the column as the suggested number of marbles to be used with the invention. More or fewer ball members may be used with the invention, as will be clarified in the description of the invention hereinafter. The column of ball members is not to completely fill the length of cylinder 11, but a distance L is to remain between the top ball member ($j$) and the cylinder top 12. A peg member, indicated in general by numeral 26, is shown partially inserted in cylinder 11.

Peg member 26 is shown in more detail in FIG. 2 as including an elongated shank 27 of circular cross-section and square-cut end 27a. The diameter of peg member 26 should be slightly less than the inside diameter of cylinder 11, or about the diameter of a ball member. Above shank 27 is shoulder portion 28 having a diameter substantially larger than the diameter of shank 27 and having a length of about three-fourths of 1 inch. The shank and shoulder portion of the peg member may be formed from wood, rigid rubber, rigid plastic, etc. On the upper end of shoulder 28 is connected a card holder, indicated in general by numeral 29, for selectively holding a card such as card 30 of FIG. 4. Other types of card holders may be devised, of which the embodiment of holder 29 in FIG. 2 is only one example. Holder 29 includes a base portion 31 which is secured to the top of shoulder 28, rear barrier 33, and side walls 32 and 32a respectively. The side walls 32 and 32a have an undercut in order to form a slot for insertion of a card. An extremely important consideration in the configuration of holder 29 and in the material from which it is constructed is safety to a young child. Thus, in the embodiment shown, all of the edges of the holder, as well as all other edges and corners on the structure of the invention, should be rounded.

Figure 7:
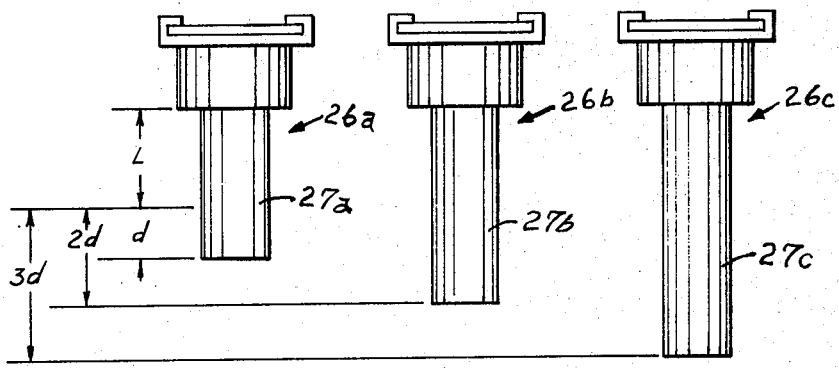
FIG. 7 is a detail of some of the components of the invention.

According to the invention, a plurality of peg members are provided. FIG. 7 shows three such peg members 26a, 26b, and 26c. The peg members differ in shank length from one another by multiples of an incremental length $d$, when $d$ is the diameter of a ball member utilized with the invention. The length of each shank is L plus integral multiples of length $d$, where L has been previously defined herein. When ten ball members, as shown, are used with the invention, ten peg members are needed where the length of the shortest peg member is L plus $d$, and the length of the longest peg member is L plus ten times $d$. Frame 1 (FIG. 1) is conveniently provided with a series of apertures 34 in top 6 for holding the peg members. Furthermore, each of the peg members should be painted a different, distinct color.

Card 30 of FIG. 4 may be of cardboard, stiff paper or plastic and of a size suitable to be inserted in card holder 29 (FIG. 6). A large number of such cards may be provided with the invention, each card having a mathematical different expression printed thereon. The arithmetic expressions may include addition, subtraction, multiplication, or division. The solutions to such arithmetic expressions should be an integer value between 1 and 10 for the illustrated embodiment of the invention. Convenient further limitations on the expressions are to utilize only positive integers up to 9, and to involve only the operations of addition and subtraction; about 512 different expressions are then possible. The cards are color coded to the peg members such that a card having an arithmetic expression printed thereon whose value is $n$ will be color matched to a peg member whose length is L plus $nd$. It is convenient, although not necessary to provide a storage container on the frame 1 of the invention to hold the cards. FIG. 1 shows a box 54 with top 35 with hinges 36a.

In an embodiment of the invention using 10 marbles and 10 pegs, the number combinations of addition, subtraction, multiplication and division may be as many as 122. Thus 122 cards may be used, or a lesser number used according to the desires of the maker. The problem cards may be made in sets, i.e. all addition, all subtraction, etc. As pointed out, each card is color coded to the peg which releases the number of marbles equal to the answer of the problem.

In operation, the cylinder 11 is loaded with a column of marbles. A child then selects a card which displays an arithmetic expression, and the child matches the card to a peg via color. Having inserted the card in the holder 29, the child inserts the peg shank in cylinder 11. Grasping the peg with the shoulder between his forefinger and index finger and with his thumb bearing against holder base 31, the child pushes the peg on into the cylinder; the shoulder 28 prevents the child's fingers from being injured. The peg member will push a predetermined number of ball members past the detent means. The detent will stop the release of more ball members once the peg member is no longer exerting pressure on them. The number of ball members released will equal the total incremental length of the peg member chosen. The ball members which are released from behind the detent will be discharged out the tube end, drop upon the ramp, roll down the ramp and into the catch basin. The child is thus presented with physical evidence to verify the solution to the arithmetic expression imprinted on the card. Reinserting the marbles in the cylinder encourages the child to count the discharged marbles.

I claim:

1. An educational toy comprising, in combination:
   a. frame means;
   b. a hollow cylinder, having an inlet end and an outlet end, fixedly mounted on said frame means with said outlet end being downward;
   c. ramp means fixed in said frame means adjacent said outlet;
   d. catch basin means mounted adjacent the lower end of said ramp;
   e. a plurality of spherical, generally non-deforming ball members having diameters slightly less than the diameter of said cylinder for insertion therein;
   f. detent means adjacent said outlet for temporarily maintaining said ball members in said cylinder in the absence of downward release movement of said ball members therepast when suitable downward force is exerted on said ball members; and
   g. a plurality of elongated peg members, each peg member of said plurality having a shank differing in length from the others by integer multiples of an incremental distance where said incremental distance is said diameter of said ball members, and each said shank having a transverse diameter less than the diameter of said cylinder so as to be insertable in said cylinder, and each said peg member having a shoulder above its shank of sufficient radial extent to restrict insertion of said peg member into said cylinder beyond said shank, and each of said peg members having grasping means above said shoulders; whereby, when said cylinder contains a column of said ball members and one of said peg members is inserted into said cylinder to contact the upper ball member of said column and said peg member is inserted to its fullest extent into said cylinder, a predetermined number of said ball members will be forced past said detent means and out said discharge end to roll down said ramp into said catch basin.

2. An educational toy according to claim 1 wherein the longest of said peg members includes a shank long enough to extend from said inlet to said detent means.

3. An educational toy according to claim 2 wherein each of said peg members is of a distinctive color.

4. An educational toy according to claim 2 wherein each said grasping means includes holding means to hold a small card.

5. An educational toy according to claim 4 including a plurality of cards insertable into said holder, and each card of said plurality of cards displays an arithmetic expression whose solution is a positive integer.

6. An educational toy according to claim 5 wherein each of said peg members is of a distinctive color and said cards are color coded to the colors of said peg members such that when one of said peg members having a color matching the coloring of a card is inserted fully into said cylinder containing said plurality of ball members, the number of ball members which will be driven past said detent means is the number which is the solution to the arithmetic expression on said card.

7. An educational toy according to claim 6 including a container attached to said frame for holding said plurality of cards.

8. An educational toy according to claim 1 wherein said plurality of peg members is ten peg members and said plurality of ball members is ten ball members.

9. An educational toy according to claim 1 wherein said frame includes a plurality of apertures therein, each aperture of said plurality for holding one peg member of said plurality of peg members.

10. An educational toy according to claim 1 wherein said detent means includes a ball bearing positioned so as to protrude slightly into said cylinder and spring means to maintain the position of said ball bearing.

11. An educational toy comprising, in combination: (1) a plurality of ball members; (2) supporting means for supporting ball members one above the other in a column; (3) releasable means for releasing the ball members from said column; and (4) a plurality of peg members, each peg member of said plurality having a different length shaft, the shafts arranged to seat on the top one of said ball members whereby pressure exerted on a shaft seated on the top ball member releases a number of ball members determined by the length of the shaft.

* * * * *